F. ROBBINS.
MACHINE FOR REMOVING THE CORES AND STONES FROM FRUIT.
APPLICATION FILED JAN. 20, 1921.

1,387,183.

Patented Aug. 9, 1921.

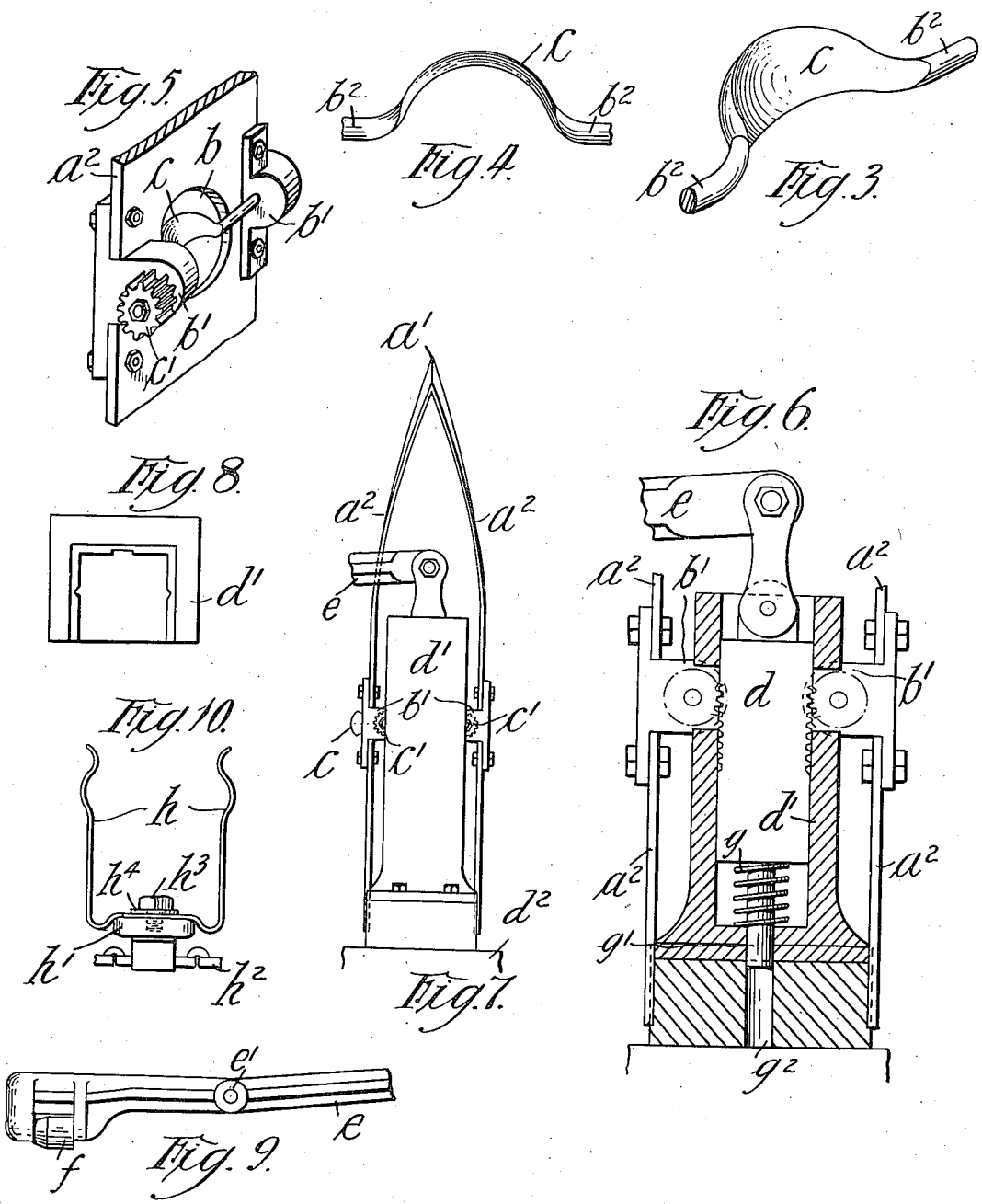

UNITED STATES PATENT OFFICE.

FRANK ROBBINS, OF CLIFTON HILL, VICTORIA, AUSTRALIA.

MACHINE FOR REMOVING THE CORES AND STONES FROM FRUIT.

1,387,183.  Specification of Letters Patent.  Patented Aug. 9, 1921.

Application filed January 20, 1921. Serial No. 438,562.

*To all whom it may concern:*

Be it known that I, FRANK ROBBINS, a subject of the King of Great Britain, residing at 94 Ramsden street, Clifton Hill, in the State of Victoria, Australia, have invented certain new and useful Improvements in Machines for Removing the Cores and Stones from Fruit; and I do declare the following to be a full, clear, and exact description of the invention, such as will enable others skilled in the art to which it appertains to make and use the same.

This invention has been devised to provide improvements in machines for coring and removing the stones from fruit and refers mainly to that type of machine shown in Letters Patent No. 1,357,004, granted to me October 26, 1920, for a machine for removing stones from fruit and in which the fruit is carried by cups to meet a high speed saw or cutting medium which cuts the fruit in half, each half being conveyed by the continuous rotary movement of the cups to and along a V-shaped director provided with openings in each side plate where each halved fruit is treated to remove the core or stone from its seat.

In describing my invention I shall refer to the removal of stones from peaches. It has been found that some varieties of fruit are affected in such a manner while on the tree, that the stone becomes very brittle and in many instances fragmentary. Such fruit when treated for the removal of the stone becomes injured or spoilt, partly owing to the fragments of the stone penetrating the fruit during operation and partly to a piece of stone adhering to the fruit, necessitating further treatment by hand for removal purposes.

My invention overcomes the foregoing disadvantages in a simple and efficient manner and furthermore provision is made to provide a continuous feed of the fruit to the receiving cups and means are also embraced to insure the sliding tube to which the cup is attached moving inwardly to its full extent so that the fruit which is held at each side by the oppositely disposed cups will be in a position to meet the saw approximately at its center to provide a clear central cut.

In order that my invention may be the more easily understood reference will be made to the accompanying sheets of drawings in which:—

Fig. 3 is a general view of the knife.

Fig. 4 is a plan view of same.

Fig. 5 illustrates the knife and its bearings and an opening in the plates of the director hereinafter referred to.

Fig. 6 is a sectional elevation of the actuating rack bar and its parts.

Fig. 7 is an end view of the V-shaped director and guide casing inclosing the rack bar.

Fig. 8 is a plan view of the casing inclosing the rack bar.

Fig. 9 is a sectional view illustrating the actuating arm hereinafter described while—

Fig. 10 is a side elevation of the fingers attached to a link conveyer or belt such fingers gripping the fruit and carrying same to meet the receiving cups as hereinafter explained.

Figure 1:
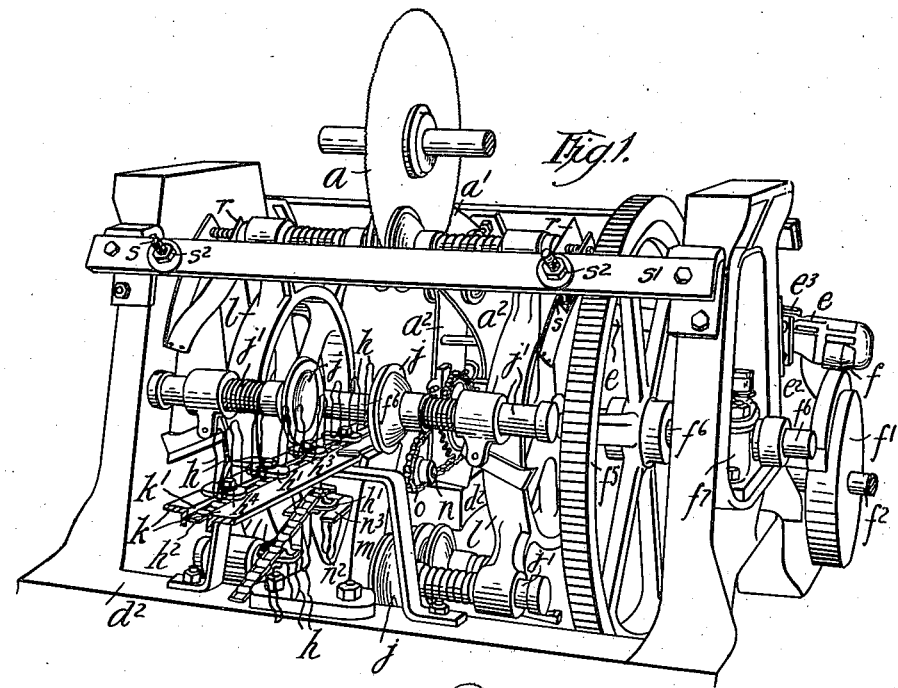
Figure 1 is a front view of the type of machine referred to showing my improvements thereon which are hereinafter described. Certain parts of the machine are omitted for sake of clearness.
Figure 2:
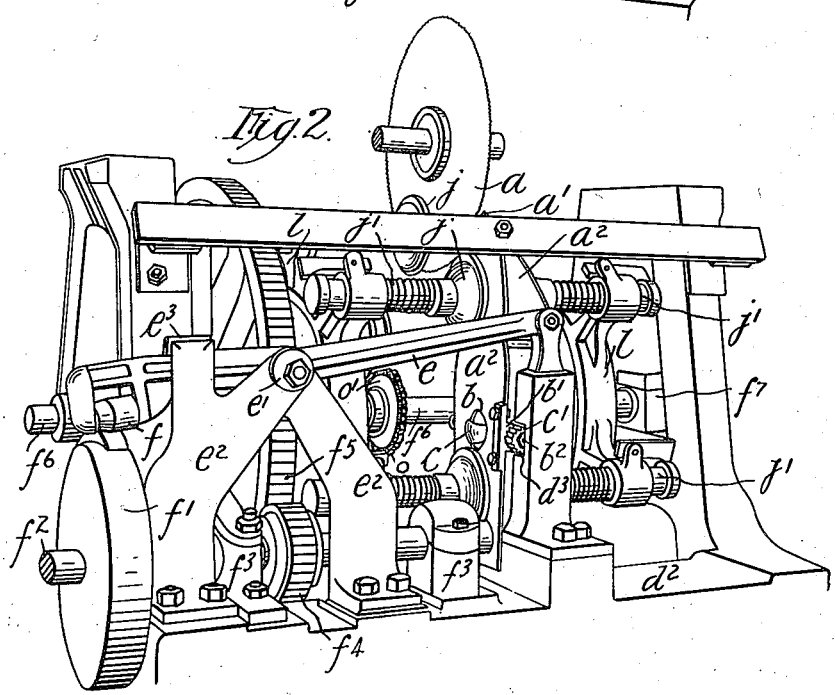
Fig. 2 is a rear view of the same machine showing one of the knives projecting through one of the openings hereinafter described.

At the rear of the cutting medium, preferably a saw $a$, is a V-shaped director $a'$; provided in each wall plate $a^2$ of same at a predetermined distance from its top is an opening $b$ of a required shape; preferably it is approximately 2″ in depth by 1½″ in width. On the interior of the walls $a^2$ of the director $a'$ at each side of the said opening are bearings $b'$ in each of which is mounted a horizontal spindle $b^2$, a portion of which is enlarged and curved or made angular in shape to form a cutting blade $c$ which in its semi-rotary or rotary movement provides a cutting and scooping out action. Each blade $c$ operates within its respective opening $b$. The spindle $b^2$ receives its rotary motion through a pinion wheel $c'$ thereon which engages a rack bar $d$ (see Fig. 6). The latter operates in the guide $d'$ whose base is secured to one of the bars of the frame $d^2$ of the machine, such guide having slots $d^3$ in which the pinion wheels $c'$ operate in engagement with the rack bar $d$. The vertical movement of such rack bar $d$ is adjusted to allow the blade $c$ to make a semi-rotary or rotary movement on either its upward or downward motion, such action causing the blade to pass behind the halved stone or the core releasing it from its seat in the fruit simultaneously pulling it forward through the opening $b$ and allowing it to fall into a suitable chute or receptacle not shown. The above action takes place during the forward movement of the half of the fruit when in contact with the exterior of wall $a^2$ of the director $a'$.

The rack bar $d$ receives its motion from a rocking lever arm $e$ fulcrumed at $e'$ at the top of the bracket arms $e^2$ with guide $e^3$. The arm $e$ is actuated by the contact of a roller $f$ thereon with a cam $f'$ mounted on a shaft $f^2$ running in bearings $f^3$ fixed to one of the bars of the frame $d^2$ of the machine, such shaft $f^2$ in turn receiving motion through gearing comprising a spur wheel $f^4$ and cog wheel $f^5$ the latter being mounted on the main shaft $f^6$ running in suitable bearings such as $f^7$. Additional vertical movement is imparted to the rack bar $d$ by the spring $g$ disposed under such bar in contact with the base of the guide $d'$ and also encircling the pin $g'$ whose lower end operates in the vertical hole $g^2$.

The fruit for treatment is fed by hand into vertical curved spring fingers $h$ adjustably secured to a sliding plate or block $h'$ fixed to links $h^2$ forming a sprocket conveyer. The said fingers are adjusted according to the size of the fruit by means of a nut $h^3$ and washer $h^4$, for large fruit the fingers are extended to nearly the full length of the horizontal piece gripped by the washer. Fig. 10 illustrates the fingers $h$ set for a minimum size of fruit, the tension of each finger allowing the fruit to enter between them, but on reaching a distance equal to its full diameter it will be gripped owing to the springy nature of the fingers exerting sufficient pressure for that purpose, the fruit being thus held firmly in position during their forward movement to a position in front of the receiving cups $j$ integral with the sliding tube $j'$, fully described and illustrated in the above mentioned Letters Patent. The plate or block $h'$ with the fingers $h$ slides along on the flat surface of the top angular portion of two parallel angle-iron bars $k$ set in position to provide a central slot $k'$ which forms a guide for the links $h^2$ hereinbefore referred to. Each sliding plate or block $h'$ with the fingers $h$ is fixed in the usual manner on the links $h^2$ at desired intervals apart, the spacing being regulated according to the number of receiving cups $j$ employed on the wheels $l$. Care must be taken when adjusting such blocks $h$ that same are positioned to meet the respective cup $j$ as it passes out of engagement with the inverted V-shaped bracket $m$ fixed to one of the bars $d^2$ of the frame, at the front thereof. Each of the cups $j$ in being released makes a forward movement gripping the fruit, the latter resting in the hollow of the respective cup, which in their forward and upward movement remove the fruit from the fingers $h$. The conveyer hereinbefore referred to runs on suitable sprocket wheels, not shown, one of which is mounted in any convenient point at the front of the machine while the other, not shown, is mounted on a spindle $n$ running in bearings attached at the inner end of the inverted bracket $m$, the conveyer in its continuous forward movement passes through the opening $n^2$ formed by the sides of the bracket and to obviate obstruction of the fingers $h$ during such movement sliding inclined plates $n^3$ are provided being positioned to cause the sliding plates or blocks $h'$ and fingers $h$ to rise and pass out clear of and close to the top of the bracket $m$. The conveyer receives its motion from the main shaft through a sprocket chain $o$ and wheels $o'$ one of which is carried on the shaft $n$ and the other on the main shaft $p$.

Additional horizontal forward pressure is applied to each of the cups $j$ by the spring plates $r$ which are supported by the arm $s$ held in the bar $s'$ by nut $s^2$, such plates $r$ are positioned to meet the outer end of the sliding tube $j'$ as it makes its upward rotary movement and almost simultaneously on it reaching the end or nearly so of its horizontal movement this action insures the fruit being in a position to allow the saw to cut approximately through its center.

I claim:

1. In a machine for removing stones from fruit, devices for receiving and holding fruit, means for halving the fruit while held in said devices, means for separating said devices, a curved knife, and means for imparting motion to the said knife to remove the core or stone from the said fruit.

2. In a machine for removing stones from fruit, devices for engaging and holding the fruit, means for halving the fruit while held by the said devices, a V-shaped director having walls for separating the said fruit holding devices and maintaining the same in spaced positions, a curved knife adapted to operate in an opening provided in a wall of the said director, and means for actuating the said knife to remove the core or stone from the fruit.

3. In a machine for removing stones from fruit, devices for receiving and holding the fruit, means for halving the fruit while held by the said devices, a V-shaped director having spaced walls adapted to separate the said devices for holding the fruit, there being an opening provided in each of the walls of the said director, a curved knife operating through the hole in each wall of the director, bearings on each wall of the said director, spindles upon which the knives are mounted and which are journaled in the said bearings, and means for actuating the said curved knives for removing the core or stone from fruit.

4. In a machine for removing stones from fruit, devices for receiving and holding the fruit, means for halving the fruit while held by the said devices, a V-shaped director having spaced walls adapted to separate the said devices for holding the fruit, there being an opening provided in each of the walls of the said director, a curved knife operating through the hole in each wall of the director, bearings on each wall of the said director, spindles upon which the knives are mounted and which are journaled in the said bearings, a pinion mounted on one of the spindles of each knife, a rack gearing with each pinion, and means for actuating the rack to operate the pinions and actuate the knives to remove the cores or stones from the fruit.

5. In a machine for removing stones from fruit, devices for receiving and holding the fruit, means for halving the fruit while held by the said devices, a V-shaped director having spaced walls adapted to separate the said devices for holding the fruit, there being an opening provided in each of the walls of the said director, a curved knife operating through the hole in each wall of the director, bearings on each wall of the said director, spindles upon which the knives are mounted and which are journaled in the said bearings, a pinion mounted on one of the spindles of each knife, a rack gearing with each pinion, a lever connected at one end to the said racks and at the opposite end provided with a roller, and a cam coöperating with the said roller and lever for moving the said racks to actuate the pinions and operate the knives to remove the cores or stones from the fruit.

In testimony whereof I have signed my name to this specification in the presence of two subscribing witnesses.

FRANK ROBBINS.

Witnesses:
AUGUSTINE THOMAS MADDEN,
FLORENCE SINCLAIR.